March 22, 1960

B. J. WALLIS 2,929,485

TRANSFER DEVICE

Filed Dec. 2, 1957

INVENTOR.
BERNARD J. WALLIS
BY
Barnes, Kisselle, Raisch & Choate
ATTORNEYS.

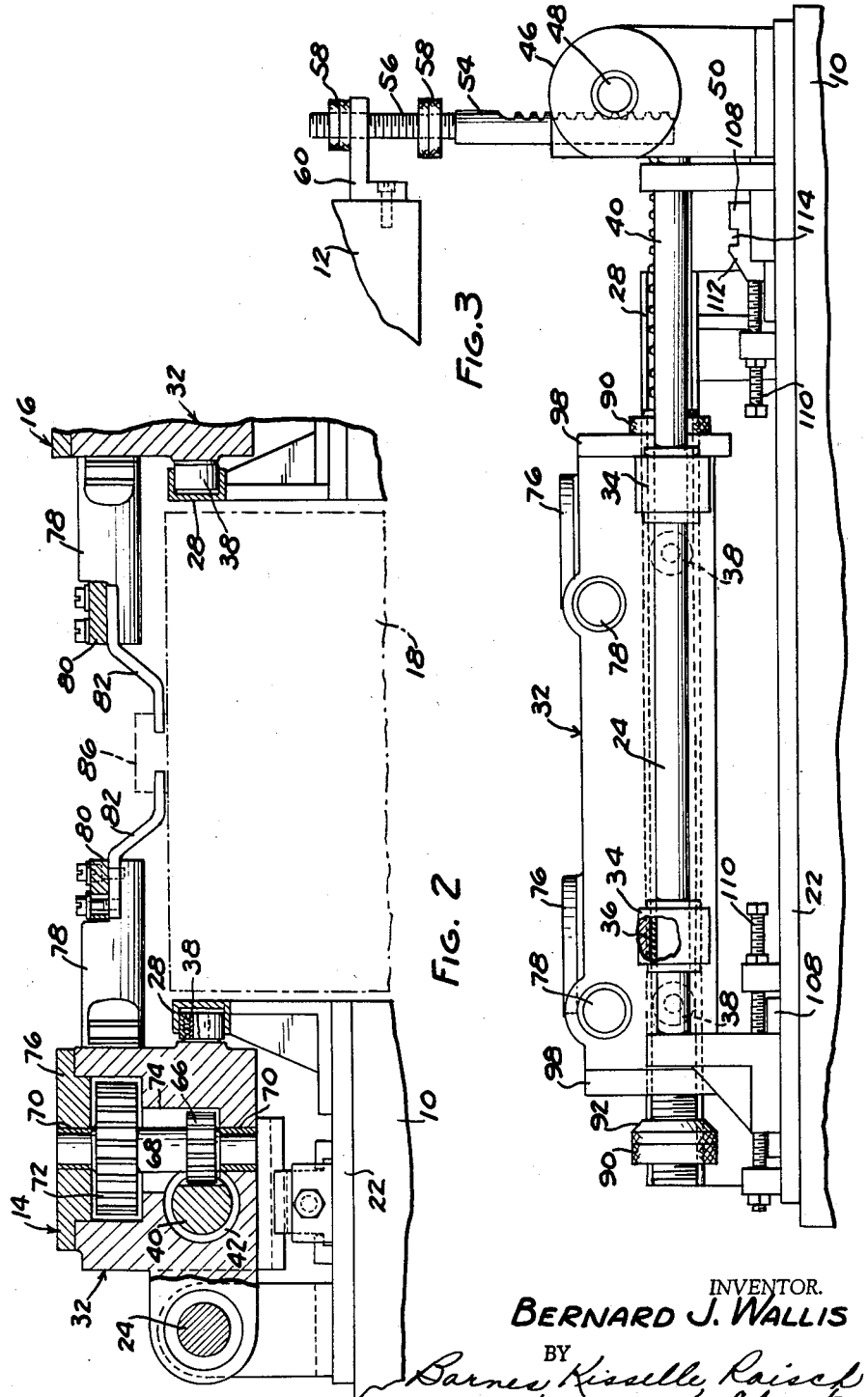

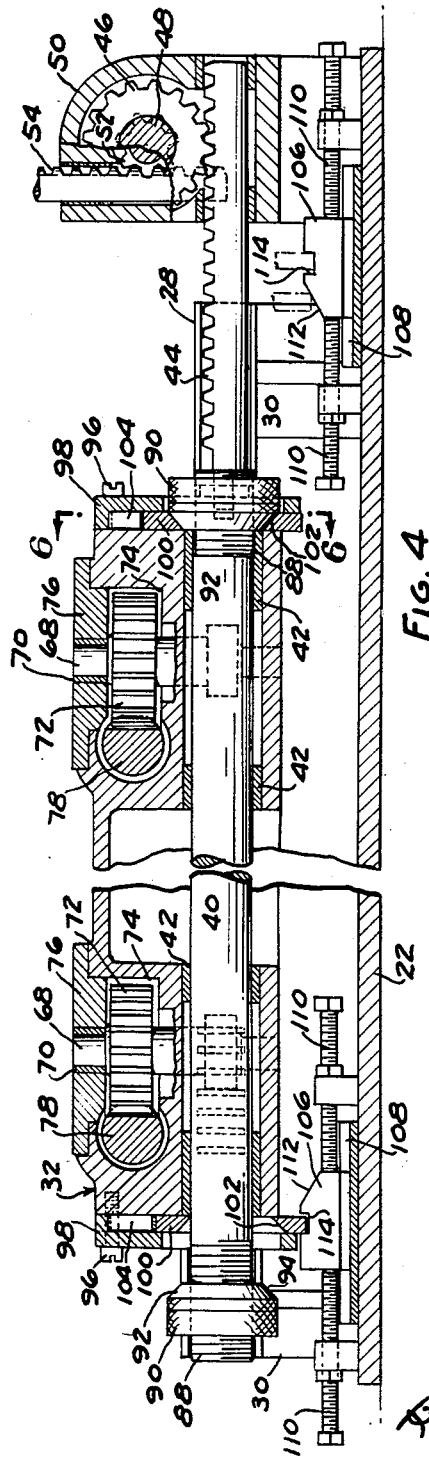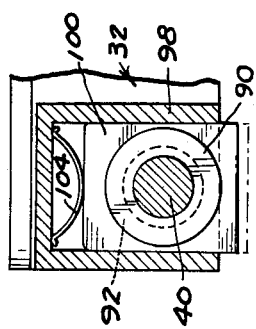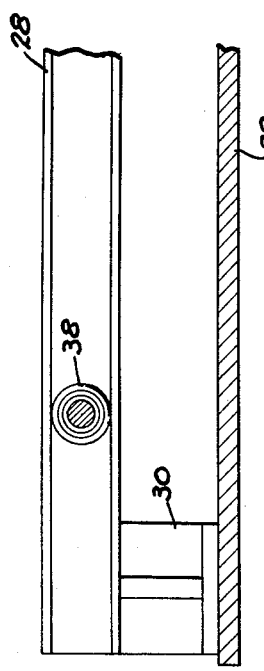

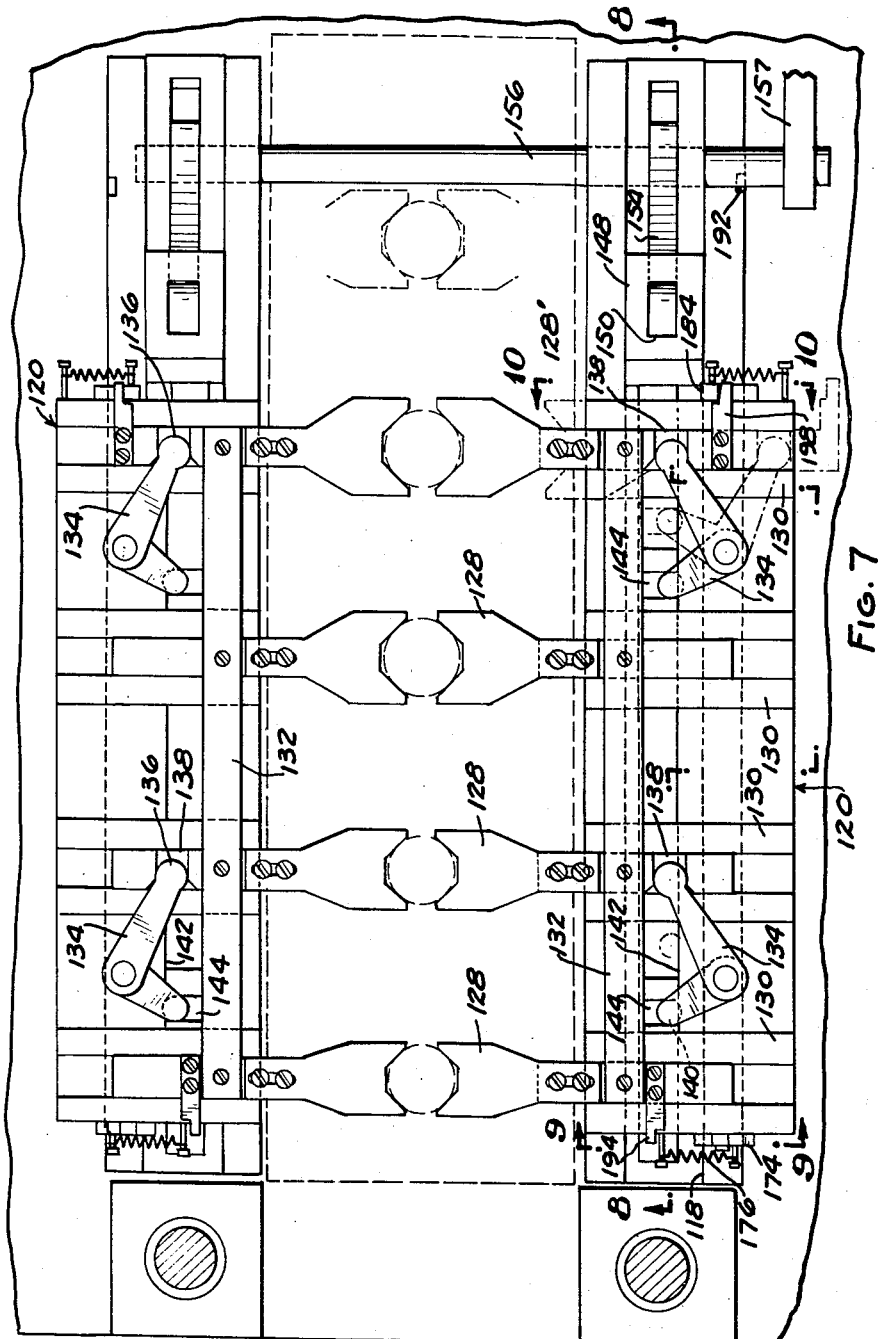

March 22, 1960  B. J. WALLIS  2,929,485
TRANSFER DEVICE
Filed Dec. 2, 1957  6 Sheets-Sheet 5
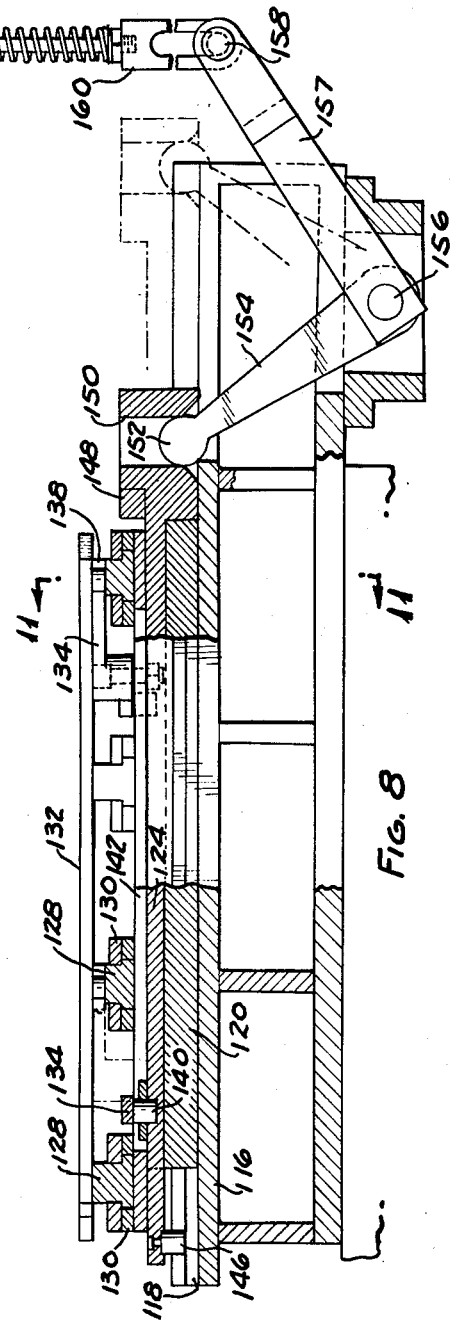
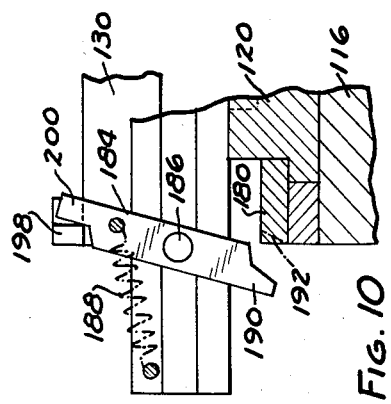
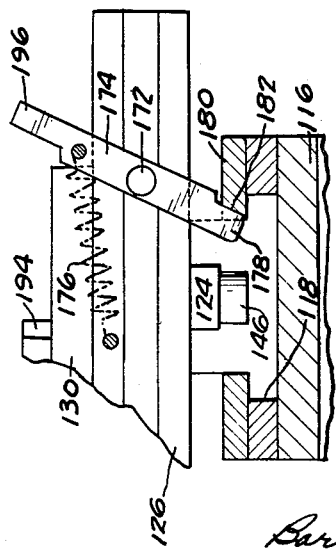
INVENTOR.
BERNARD J. WALLIS
BY
Barnes, Kisselle, Raisch & Choate
ATTORNEYS

United States Patent Office 2,929,485
Patented Mar. 22, 1960

2,929,485

TRANSFER DEVICE

Bernard J. Wallis, Dearborn, Mich.

Application December 2, 1957, Serial No. 700,198

27 Claims. (Cl. 198—19)

This invention relates to a transfer device and more particularly to a device designed to move work pieces progressively through a plurality of spaced stations arranged in a rectilinear path.

The transfer device of the present invention is particularly adapted for use with punch presses or machines having a plurality of stations thereon for progressively forming a work piece.

The object of the present invention is to provide a transfer device of the mechanical type which is relatively simple in construction and positive in operation.

In the drawings:

Fig. 2 is a sectional view of the device taken along the line 2—2 in Fig. 1.

Fig. 3 is a fragmentary side elevational view of the transfer device shown in Fig. 1.

Fig. 4 is a sectional view along the line 4—4 in Fig. 1.

Fig. 5 is a fragmentary sectional view along the line 5—5 in Fig. 1.

Fig. 6 is a fragmentary sectional view along the line 6—6 in Fig. 4.

Fig. 7 is a top plan view of a modified form of transfer device according to the present invention.

Fig. 8 is a sectional view along the line 8—8 in Fig. 7.

Fig. 9 is a fragmentary sectional view along the line 9—9 in Fig. 7.

Fig. 10 is a sectional view along the line 10—10 in Fig. 7.

Figure 1:
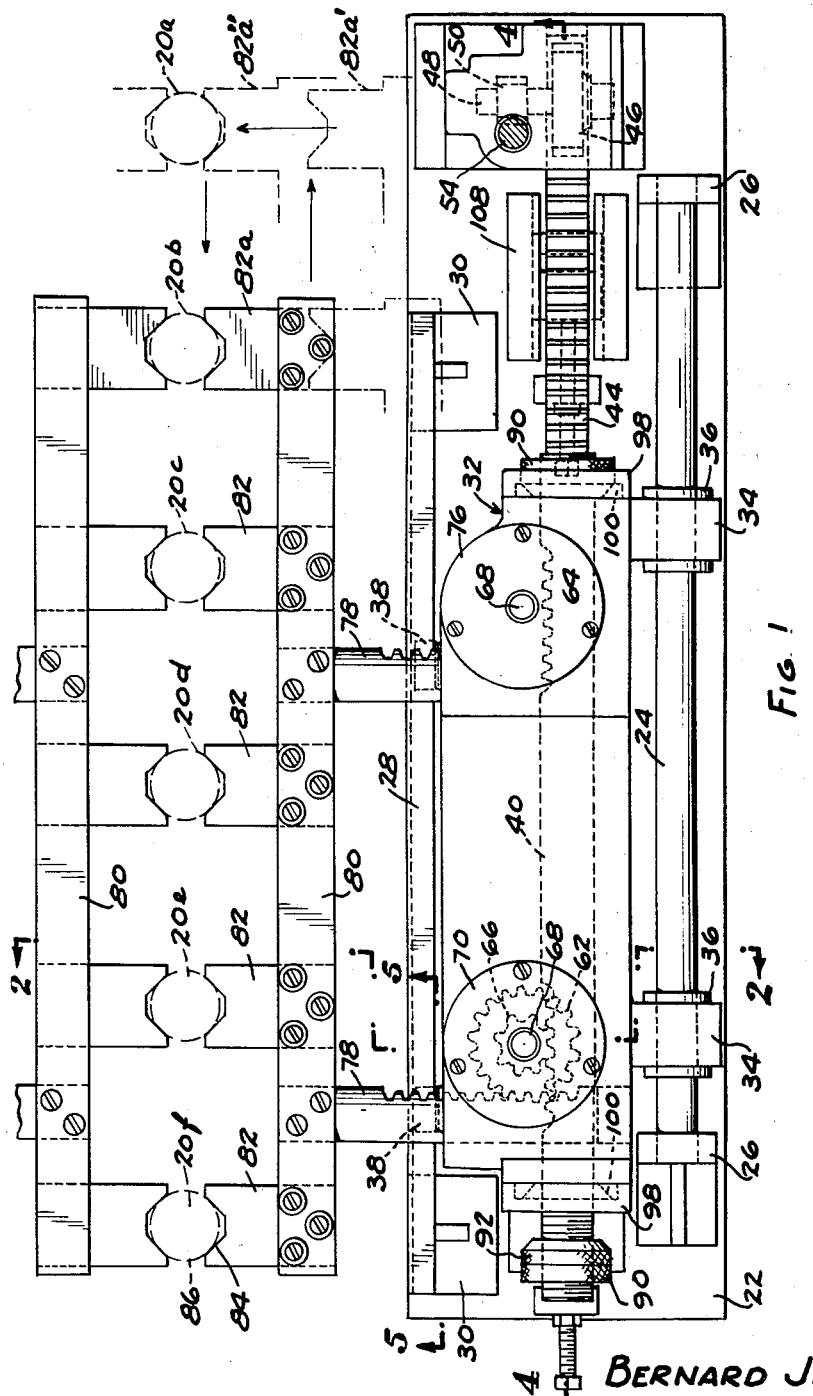
Fig. 1 is a fragmentary top plan view of the transfer device according to the present invention.
Figure 11:
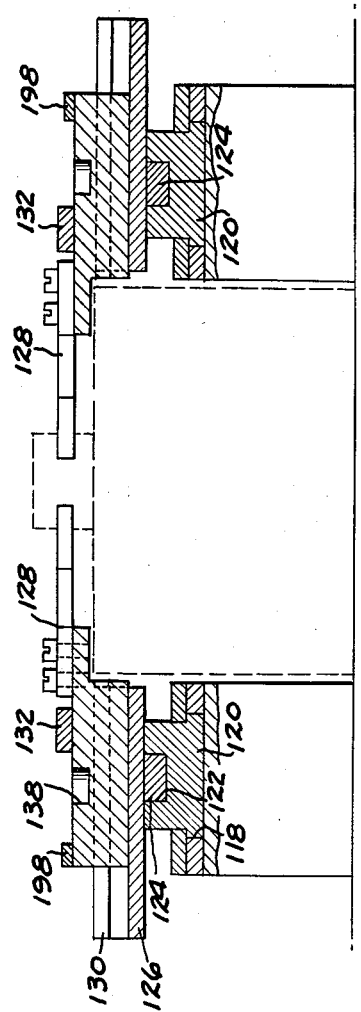
Fig. 11 is a sectional view along the line 11—11 in Fig. 8.

For the purposes of description and not by limitation, the transfer device is illustrated in connection with a punch press provided with a bed 10 and a ram, a portion of which is shown at 12 in Fig. 3. The transfer device preferably includes two assemblies 14 and 16 arranged on the bed 10 on opposite sides of a die 18 having a plurality of stations thereon designated as 20a through 20f. The two assemblies 14 and 16 are of identical construction, and a complete description and showing of only one is therefore necessary. Each assembly includes a base plate 22 on which a horizontally disposed guide shaft 24 is mounted by brackets 26 at each end thereof. As is shown in Figs. 1 and 2, guide shaft 24 is arranged along one side of base plate 22 and a guide channel 28 is arranged along the opposite side of base plate 22. Channel 28 is supported at each end by means of brackets 30. A slide 32 is mounted for reciprocation lengthwise of base 22 on shaft 24 and channel 28. Slide 32 is provided with a pair of bosses 34 fitted with bearings 36 arranged in rolling engagement with shaft 24. One or more roller bearings 38 are also mounted on slide 32 and engage within guide channel 28 so that the slide 32 slides freely lengthwise of base 22.

Within slide 32, there is arranged a horizontally disposed actuator shaft 40. Shaft 40 is slidably arranged within bushings 42 so as to slide freely within slide 32.

At one end thereof, shaft 40 is fashioned with a rack portion 44 that meshes with a gear 46. Gear 46 is fixed on a stub shaft 48 journalled within a gear housing 50. A small gear 52 is also fixed on stub shaft 48 and meshes with a gear rack 54. The upper end of gear rack 54 is threaded as at 56 and provided with adjustable stop nuts 58 between which is arranged a lug 60 fixed on the portion 12 of the ram. As the ram 12 moves downwardly, lug 60 strikes the lower stop nuts 58 to shift rack 54 downwardly and through gear set 52, 46 to shift guide shaft 40 to the right as viewed in Figs. 1 and 4.

Actuator shaft 40 is also formed with longitudinally spaced gear rack portions 62 and 64. Each of these gear rack portions meshes with a gear 66 fixed on a vertically disposed stub shaft 68. The two stub shafts 68 are journalled in bushings 70 at opposite ends thereof. On each of the stub shafts 68, there is also fixed a second gear 72. The two gear sets are arranged in vertically bored sockets 74 in slide 32. The upper end of each socket 74 is closed by a top bearing cap 76 in which the upper bushing 70 is mounted. A pair of horizontally disposed gear racks 78 are slidably arranged in slide 32 on an axis perpendicular to the axis of actuator shaft 40. Each gear rack 78 meshes with one of the gears 72. The outer ends of each gear rack 78 are interconnected by a support bar 80 having a plurality of work gripping fingers 82 mounted thereon. The spacing of fingers 82 on support bar 80 corresponds to the spacing between the stations 20 on the die. Fingers 82 are fashioned at their free ends with appropriate gripping faces 84 to accommodate the work pieces. The work pieces are shown for the purposes of illustration as cylindrical objects 86.

Adjacent the opposite ends of slide 32, actuator shaft 40 is provided with threaded portions 88. On each of these threaded portions, there is arranged a pair of round adjustable stop nuts 90, 92. The stop nuts 92 are fashioned with one face thereof chamfered as at 94. At each end face of slide 32, there is mounted as by screws 96 a guide plate 98; and within each guide plate, there is slidably mounted for vertical movement a detent 100 fashioned with a centrally chamfered opening 102 which surrounds actuator shaft 40. Between the upper end of each detent 100 and the upper end of each guide plate 98, there is arranged a leaf spring 104 which biases the detents 100 downwardly to a position wherein the chamfered aperture 102 engages the top side of actuator shaft 40. A pair of cam blocks 106 are slidably mounted in slide plates 108 adjacent opposite ends of base plate 22 and in alignment with detents 100. The position of each cam block 106 is adapted to be adjusted lengthwise of base plate 22 by adjusting screws 110. Each cam block 106 is fashioned with a cam face 112 and a notch 114 for receiving the lower ends of detents 100.

In operation, let us assume that the press ram is at the upper end of its stroke as shown in Fig. 3 so that the various components of the transfer device are in the positions illustrated in Fig. 1. After the press ram descends through a predetermined distance, lug 60 on the ram part 12 engages the lower adjustable stop nuts 58 and thus drives rack 54 downwardly. Downward movement of rack 54 causes through gear set 46, 52 movement of actuator bar 40 to the right (Figs. 1, 3 and 4). This in turn causes gear set 66, 62 to rotate in a counterclockwise direction as viewed in Fig. 1 to retract the work engaging fingers 82. The adjustable stop nuts 90, 92 at the left end of actuator shaft 40 as viewed in Figs. 1 and 4 are adjusted such that when the fingers 82 approach their fully retracted position, the chamfered face 94 of adjusting nut 92 engages the bevelled face 102 on detent 100 on the top side of shaft 40 to shift detent 100 upwardly against the tension of spring 104 and out of engagement with notch 114. This establishes a driving connection between shaft 40 and slide 32 so that further movement of shaft 40 to the right as viewed in Figs. 1, 3 and 4 causes slide 32 with the fingers 82 mounted thereon to shift from the solid line position shown in Fig. 1 to the right to the position shown in broken lines.

The lower adjustable stop nuts 58 on rack 54 are adjusted such that when the press ram reaches the bottom of its stroke, the work gripping finger 82a is shifted to a position in transverse alignment with station 20a. This position is designated 82a' in Fig. 1. Stations 20a through 20f are spaced apart equal distances. When the press ram moves upwardly from its lowermost position after a predetermined amount of travel, the lug 60 engages the upper adjustable stop nuts 58 on rack 54 to shift actuator shaft 40 to the left as viewed in Figs. 1, 3 and 4. At this time, the detent 100 at the right end of slide 32 is engaged within the notch 114 of its associated cam block 106 and movement of actuator 40 in a direction to the left causes fingers 82 to be projected to the work engaging position. Thus, finger 82a is shifted from the position designated 82a' to the position designated 82a". The other fingers are correspondingly projected to the work engaging position so that the fingers on the two assemblies engage the work pieces 86 at the various stations. As the fingers 82 approach their fully projected position, the chamfered face 94 of the adjustable stop nut 92 at the right end of shaft 40 engages the bevelled face 102 of its associated detent 100 to lift the detent out of notch 114 of its associated cam block 106 and establish a driving connection between shaft 40 and slide 32 for movement of the slide to the left. The work pieces gripped by the fingers 82 are thus carried to the next successive station; and as the slide 32 approaches the end of its stroke, the lower end of detent 100 at the left end of slide 32 engages the cam face 112 of its associated cam block 106 so that at the end of the stroke of slide 32, this detent engages within notch 114 to hold the slide in fixed position. Thus, by the adjustment of screws 110, stop nuts 90, 92 and stop nuts 58, the stroke of slide 32 can be accurately correlated with the stroke of the press and the distance between successive stations.

In the form of transfer device illustrated in Figs. 7 through 11, the base 116 of each assembly is fashioned with a rectilinear guideway 118 in which a slide 120 is mounted for reciprocation. Slide 120 is in turn fashioned with a rectilinear guideway 122 in which an actuator bar 124 is mounted for longitudinal reciprocation. On the top face of slide 120, there is mounted a cover plate 126. A plurality of work engaging fingers 128 are reciprocably mounted on cover plate 126 by means of guide members 130. All of the work engaging fingers 128 are interconnected for movement in unison by a tie bar 132. A pair of bellcranks 134 are pivotally mounted on cover plate 126 as shown. Each bellcrank has a rounded end 136 arranged within a slot 138 on a pair of the fingers 128. The opposite end of each bellcrank has a stud 140 projecting downwardly through an opening 142 in cover plate 126 and engaging a transverse slot 144 in actuator bar 124. At one end, actuator bar 124 has a depending stud 146 for engaging one end of slide 120; and at its opposite end, actuator bar 124 is fashioned with a boss 148 which is adapted to engage the other end of slide 120. Boss 148 is fashioned with a socket 150 which receives the rounded end 152 of a crank 154. Crank 154 is fixed on a pivoting shaft 156. At one end, shaft 156 is provided with a lever 157 that is pivotally connected as by a pin 158 with the slotted end 160 of a vertically reciprocable rod 162. A portion of the press ram indicated at 164 has a lug 166 thereon through which rod 162 extends. Springs 168 and 170 are arranged between lug 166 and the opposite ends of rod 162.

On the left end of slide 120, as viewed in Fig. 7, there is pivoted as at 172 a detent lever 174. A spring 176 biases lever 174 in a counterclockwise direction as viewed in Fig. 9 so that the lower end 178 of lever 174 engages the gib 180 which forms in part the guideway 118. The edge of gib 180 that is engaged by the lower end 178 of lever 174 is formed with a notch 182 at a predetermined location thereon in which the lower end of lever 174 is arranged to engage to hold the slide 120 in fixed position. A lever 184 is pivotally mounted as at 186 at the opposite end of slide 120. A spring 188 biases lever 184 to a position wherein its lower end 190 engages the edge of gib 180. This edge is formed at a predetermined location therein with a notch 192 in which the lower end 190 of lever 184 is arranged to engage to hold the carriage in fixed position at the opposite end of its stroke. Lever 174 is arranged to be pivoted out of engagement with notch 182 by means of a lug 194 fixed on the finger structure 128 which is closest to lever 174. Lug 194 is adapted to engage the upper end 196 of lever 174 and pivot the lever clockwise out of engagement with notch 182 when the fingers are shifted to the retracted position shown in broken lines in Fig. 7. The finger structure 128 at the opposite end of slide 120 is also provided with a fixed lug 198 which, when the finger structure is projected to the work engaging position illustrated in full lines in Fig. 7, is adapted to engage the upper end 200 of lever 184 to pivot the lower end 190 of this lever out of engagement with notch 192.

The operation of the transfer device shown in Figs. 7 through 11 is believed to be apparent from the description thereof and will only be briefly described. Assuming that the press ram moves downwardly from its uppermost position, bellcrank 154 will be pivoted in a clockwise direction as viewed in Fig. 8, thus shifting actuator bar 124 to the left. This causes bellcranks 134 to pivot in a direction such as to retract the plurality of work engaging fingers 128 to the broken line position indicated in Fig. 7 as 128'. When the fingers reach this position, lug 194 engages the upper end of lever 174 to pivot the lower end 178 of the lever out of engagement with notch 182. At this point, stud 146 engages the adjacent end of slide 120; and further downward movement of the press ram causes the slide 120 to shift to the right as viewed in Fig. 8 within the guideway 118 to the position shown in broken lines. When the slide 120 reaches this position, the lower end 190 of lever 184 drops into notch 192 to hold the slide at this end of its stroke. Thereafter, when the press ram moves upwardly, actuator bar 124 is shifted in a direction to the left to project the fingers 128 to the work engaging position. When the fingers 128 reach the work engaging position, lug 198 strikes the upper end 200 of lever 184 to pivot the lower end 190 of the lever out of engagement with notch 192. Further upward movement of the press ram causes the slide 120 to shift in guideway 118 to the left, thus indexing the work pieces to the next station.

Thus, it will be seen that I have provided a transfer device which is of relatively simple construction and nevertheless positive in its operation. It will be appreciated that although the transfer device of this invention is mechanical in its operation, nevertheless, the actuator shaft or bar can be reciprocated by means of an air or hydraulic cylinder, if desired, while still retaining the described mechanical operation of the slide and work engaging fingers of the device.

I claim:

1. A transfer device for indexing a work piece progressively through a plurality of stations comprising a support, slide means reciprocably mounted on said support, a work engaging member bodily movable on said slide means in a direction transversely of the direction of reciprocation of the slide from a retracted position to a work engaging position, actuating means operably connected with said work engaging member, said actuating means being movable in opposite directions to bodily shift said work engaging member to said work engaging and said retracted position, said actuating means having a lost motion connection with said slide means, said lost motion connection being responsive to movement of said actuating means through a predetermined distance before establishing a driving connection between the actuating means and said slide means whereby initial movement of said actuating means shifts said work engaging member and subsequent movement of said actuating means produces movement of said slide means.

2. The combination called for in claim 1 wherein said actuating means is reciprocable through a predetermined stroke greater than the stroke of reciprocation of said slide means.

3. The combination called for in claim 1 wherein said actuating means comprises a member mounted for reciprocation on said slide means, said lost motion connection comprising means operative to positively retain said slide means at the opposite ends of its stroke and additional means operable in response to movement of said work engaging member to its work engaging position and its retracted position to overcome the influence of said retaining means and establish a driving connection between said actuating means and said slide means.

4. The combination called for in claim 1 wherein said lost motion connection includes a pair of movable abutments on said slide and means forming a pair of sockets on said base in which said abutments are engageable, said abutments and sockets being disposed such that one abutment is engaged within its associated socket when the slide means is at one end of its stroke and the other abutment is engaged within its associated socket when the slide means is disposed at the other end of its stroke.

5. The combination called for in claim 4 wherein said actuating means is mounted on said slide means for reciprocation in a direction generally parallel to the reciprocating path of said slide means.

6. The combination called for in claim 5 including resilient means normally biasing said movable abutments toward said sockets.

7. The combination called for in claim 6 including means engageable with one of said abutments to release said abutment from its associated socket when the work engaging member is shifted to the work engaging position and for shifting the other abutment out of engagement with its associated socket when the work engaging member is shifted to its retracted position.

8. A transfer device for indexing a work piece intermittently through a plurality of stations arranged in a rectilinear path comprising a support, a slide mounted on said support for reciproation along a line generally parallel to said rectilinear path, a work gripping member mounted on said slide for bodily movement in a direction generally perpendicular to the path of travel of the slide, an actuator mounted on said slide for reciprocation in a direction generally parallel to the path of movement of said slide, means operably connecting said work gripping member with said actuator so that the work gripping member is shifted in one direction to a work engaging position in response to reciprocation of said actuator in one direction and is shifted to a retracted position in response to reciprocation of said actuator in the opposite direction and means forming a lost motion driving connection between said actuator and said slide, said last mentioned means being effective to permit retraction of said work gripping member to said retracted position in response to movement of said actuator in one direction before said means become operative to shift the slide on said support in one direction and to permit projection of said work gripping member to said work engaging position in response to movement of said actuator in the opposite direction before the slide is shifted in the opposite direction on said base.

9. The combination called for in claim 8 including means releasably interengaging said slide with said support at the opposite ends of its stroke.

10. The combination called for in claim 8 wherein said lost motion connection includes a pair of abutments movably mounted on said slide and responsive to movement of the slide to a position at one end of its stroke to engage said support and releasably hold said slide in said position and responsive to movement of said slide to a position at the opposite end of its stroke to releasably engage said support to hold said slide in said last mentioned position.

11. The combination called for in claim 10 wherein said lost motion connection also includes means responsive to movement of the work gripping finger to work engaging position to release one of said abutments from engagement with the support and responsive to movement of the work gripping finger to the retracted position to release the other abutment from engagement with the support.

12. The combination called for in claim 8 wherein said lost motion connection includes abutment means on said slide and said support responsive to movement of the slide to either end of its stroke to interengage and thereby releasably retain the slide in either of said positions and additional means responsive to movement of said work gripping finger to either said work engaging or retracted position to disengage said abutment means.

13. A transfer device for indexing a work piece progressively through a plurality of stations comprising a support having a guideway, a slide mounted for reciprocation in said guideway, a plurality of work engaging fingers mounted on said slide for bodily movement on said slide in a direction generally perpendicular to the axis of the guideway to a work engaging position and a retracted position, said work engaging fingers being equally spaced along said slide, an actuator mounted for reciprocation on said slide, means limiting the stroke of said slide to the spacing between successive fingers, said actuator being operatively connected with said fingers to shift them between said work engaging and retracted positions, means for positively retaining said slide in fixed position at one end of its stroke until the work engaging fingers have been shifted bodily to retracted position and for retaining the slide in fixed position at the opposite end of its stroke until the work engaging fingers have been shifted bodily to work engaging position, a driving connection between said actuator and said slide and means permitting said actuator to reciprocate through a stroke longer than the stroke of said slide.

14. The combination called for in claim 13 wherein said retaining means comprises detent means on the slide engageable with the support and means responsive to movement of said work engaging fingers to said work engaging and retracted positions for disengaging said detent means from said slide.

15. The combination called for in claim 14 wherein said detent means comprise a pair of detents shiftably mounted on said slide, said disengaging means comprising a pair of abutments on said actuator adapted to engage and shift said detents out of engagement with the slide.

16. The combination called for in claim 14 wherein said detent means comprises a pair of detents shiftably mounted one adjacent each end of the slide, said detents each having a cam surface thereon, said disengaging means comprising a pair of abutments mounted in spaced apart relation on said actuator, said abutments each having a cam surface thereon which, when either abutment engages its associated detent, shifts the detent out of engagement with the slide.

17. The combination called for in claim 16 wherein said abutments are adjustable axially of said actuator.

18. The combination called for in claim 16 wherein said slide is provided with notches therein in which the lower ends of said detents are engageable, said detents being shiftable vertically on said slide and means aligned with the path of travel of said detents in response to movement of said slide forming cam surfaces leading to each of said notches.

19. A transfer device for indexing a work piece progressively through a plurality of stations comprising a support, means on said support forming a guideway, a slide mounted for reciprocation in said guideway, a plurality of work engaging fingers shiftably mounted on said slide for movement to a work engaging position and a retracted position, an actuator mounted for reciprocation on said slide along a path parallel to the reciprocating path of said slide, means operably connecting said actuator with each of said work gripping fingers whereby the fingers are projected to said work engaging position in response to movement of the actuator in one direction and are shifted to said retracted position in response to movement of said actuator in the opposite direction, a pair of vertically shiftable detents mounted one adjacent each end of said slide, a pair of stop means on said support spaced apart a greater distance than said detents and disposed in the path of travel of said detents and engageable with one of said detents when the slide reaches the end of its stroke in one direction and with the other detent when the slide reaches the end of its stroke in the opposite direction, a pair of abutments on said actuator, one of said abutments being disposed to engage one of said detents and shift the detent out of engagement with its associated stop member on the support when the actuator has shifted to a position wherein said work engaging fingers are in the retracted position, the other abutment being disposed to engage the other detent and disengage it from its associated stop member on the support when the actuator has shifted in the opposite direction to a position wherein said work engaging fingers are in the work engaging position.

20. The combination called for in claim 19 wherein said abutments and said stop members are adjustable in a direction parallel to the path of travel of said slide.

21. The combination called for in claim 20 including means biasing said detents downwardly.

22. The combination called for in claim 21 wherein each of said stop members is provided with a notch for receiving the lower end of said detents and an upwardly inclined face terminating at its upper edge adjacent said notch.

23. The combination called for in claim 21 wherein said detents are each provided with a cam face and said abutments are provided with a cam face, said cam faces being disposed such that when the abutments interengage said detents, said detents are shifted vertically upwardly.

24. A transfer device for indexing a work piece progressively through a plurality of stations comprising a support, means on said support forming a guideway, a slide mounted for reciprocation in said guideway, a plurality of work engaging fingers shiftably mounted on said slide for movement to a work engaging position and a retracted position, an actuator mounted for reciprocation on said slide along a path parallel to the reciprocating path of said slide, means operably connecting said actuator with each of said work gripping fingers whereby the fingers are projected to said work engaging position in response to movement of the actuator in one direction and are shifted to said retracted position in response to movement of said actuator in the opposite direction, a pair of shiftable detents mounted one adjacent each end of said slide, a pair of stop means on said support spaced a greater distance than said detents and disposed in the path of travel of said detents and engageable with one of said detents when the slide reaches the end of its stroke in one direction and with the other detent when the slide reaches the end of its stroke in the opposite direction, means responsive to movement of said actuator to disengage one of said detents from its associated stop member on the support when the actuator has shifted to a position wherein said work engaging fingers are in retracted position and to disengage the other detent from its associated stop member on the support when the actuator has shifted in the opposite direction to a position wherein said work engaging fingers are in the work engaging position.

25. The combination called for in claim 24 including means biasing said detents in a direction to engage with said stop members.

26. The combination called for in claim 25 wherein each of said stop members is provided with a notch for receiving one end of its associated detent and said means for disengaging said detents from said stops comprise a pair of abutments on the actuator.

27. The combination called for in claim 26 wherein said detents are each provided with a cam face and said abutments are provided with a cam face, said cam faces being disposed such that when the abutments interengage said detents, said detents are shifted to disengage said one end thereof from said notches.

References Cited in the file of this patent

UNITED STATES PATENTS

| | | |
|---|---|---|
| 1,426,039 | Candee | Aug. 15, 1922 |
| 2,771,172 | Bergstrand | Nov. 20, 1956 |
| 2,818,963 | DeBuigne | Jan. 7, 1958 |